United States Patent [19]

Neigel et al.

[11] Patent Number: 5,434,201
[45] Date of Patent: Jul. 18, 1995

[54] PROCESS FOR PRODUCTION OF STARCH BASED HOT MELT ADHESIVES

[75] Inventors: Dennis Neigel, Salisbury, N.C.;
Gregory A. Sweeey, Lebanon, N.J.;
Paul Altieri, Belle Mead, N.J.;
Charles W. Paul, Madison, N.J.;
Robert L. Billmers, Stockton, N.J.;
David C. Rawlins, Piscataway, N.J.

[73] Assignee: National Starch and Chemical Investment Holding Corporation, Wilmington, Del.

[21] Appl. No.: 282,353

[22] Filed: Jul. 29, 1994

[51] Int. Cl.$^6$ .................................. C08L 3/06
[52] U.S. Cl. ....................... 524/51; 106/213; 536/107; 536/110; 536/124
[58] Field of Search .................. 524/51; 106/213; 536/107, 110, 124; 156/127, 328

[56] References Cited

U.S. PATENT DOCUMENTS

| 2,461,139 | 2/1949 | Caldwell | 260/234 |
| 5,321,132 | 6/1994 | Billmers et al. | 536/48 |
| 5,360,845 | 11/1994 | Billmers et al. | 524/51 |

FOREIGN PATENT DOCUMENTS

0511016A1  11/1992  European Pat. Off. .... C09J 103/02

OTHER PUBLICATIONS

R. L. Whistler et al., "Starch: Chemistry and Technology", 1984, pp. 332-343.
O. B. Wurzburg, "Modified Starches: Properties and Uses", 1986, pp. 55-77.

Primary Examiner—Peter A. Szekely
Attorney, Agent, or Firm—Eugene Zagarella, Jr.

[57] ABSTRACT

A method of preparing a hot melt adhesive composition comprising a starch ester having a DS (degree of substitution) of 0.3 to 3.0 and a selected non-volatile, organic diluent wherein the starch ester is a wetcake having 40% or more by weight of moisture.

19 Claims, 1 Drawing Sheet

PROCESS FOR PRODUCTION OF STARCH BASED HOT MELT ADHESIVES

BACKGROUND OF THE INVENTION

This invention relates to a process for the production of starch based hot melt adhesives. More particularly, this invention involves the formulation of a hot melt adhesive using selected starch ester wetcakes.

Hot melt adhesives are 100% solid materials at room temperature which do not contain or require any volatile solvents. They are solid materials at room temperature, but, on the application of heat, melt to a liquid or fluid state in which form they are applied to a substrate. On cooling, the adhesive regains its solid form and gains its cohesive strength. In this regard, hot melt adhesives differ from other types of adhesives which achieve the solid state through evaporation or removal of solvents or by polymerization.

Generally, hot melt adhesives have been based on synthetic and natural resins and waxes, particularly petroleum derived polymers such as polyethylene, ethylene-vinyl acetate, styrenic block copolymers, and polypropylene to name a few. While starches have been used as adhesives in aqueous systems for many years, they have not been used in hot melts as the base or main-functional adhesive material. This is primarily because starch will normally not melt in the absence of water or solvent and it has therefore been difficult to formulate a starch based hot melt composition.

Recently, hot melt adhesives based on intermediate or high DS (degree of substitution) starch esters have been disclosed in copending application Ser. No. 08/106,023 filed on Aug. 13, 1993. In European patent publication 511 916 of Nov. 4, 1992 hydrogenated starch hydrolyzates were shown useful in forming hot melt adhesives.

In formulating hot melts, water is not generally used (typically avoided) and when starches such as the starch esters described above are used, they are dried prior to blending and formulating to remove or reduce the moisture content. This not only involves an extra processing step but additionally the formation of starch powder or dust creates difficult handling problems. It is well documented that starches having under about 15% moisture content pose a serious explosive potential.

Now it has been found that starch based hot melt adhesives can be formulated without a starch ester drying step and other processing precautions normally needed by using selected starch esters in wetcake form as described herein. Therefore, the starch wetcakes of this invention provide easier, safer handling and do not require special precautions.

SUMMARY OF THE INVENTION

This invention involves a method for preparing a hot melt adhesive composition comprising a starch ester having a DS (degree of substitution) of 0.3 to 3.0 and a selected diluent wherein the starch ester is a wetcake having 40% or more by weight of moisture.

More particularly, this invention is directed to a method of preparing a hot melt adhesive composition comprising a starch ester wetcake having a DS of from about 0.3 to 3.0 and 40% or more by weight of moisture and a non-volatile organic diluent, and heating to evaporate or boil off the water during the formulation step.

In another embodiment, a starch based hot melt adhesive is prepared by extruding a starch ester with a DS of from about 0.3 to 3.0 and a non-volatile organic diluent.

DETAILED DESCRIPTION OF THE INVENTION

Figure 1:
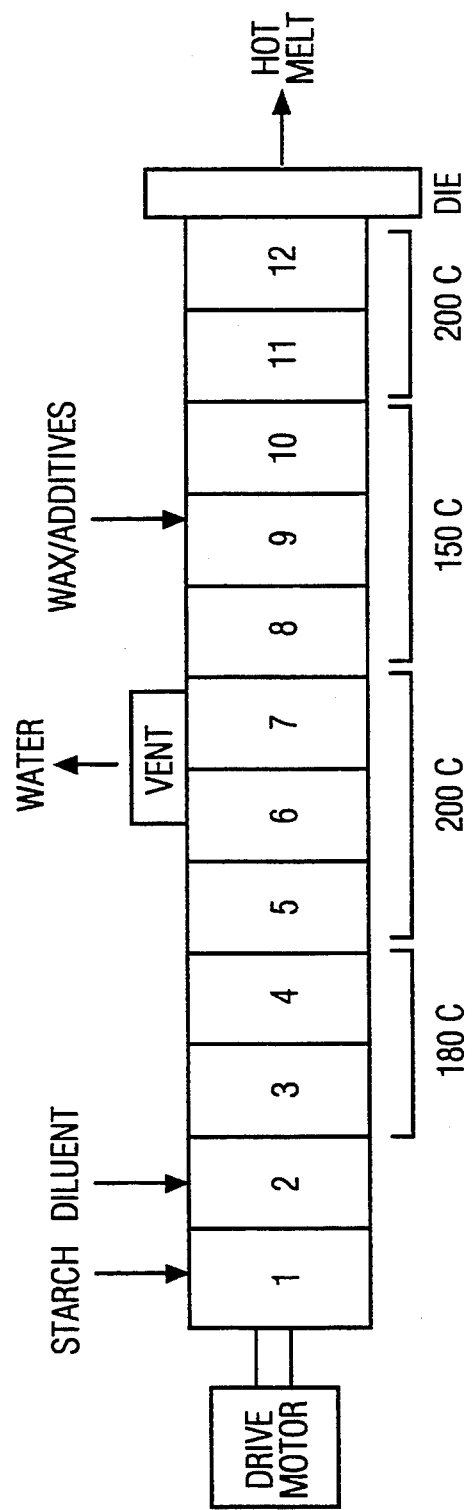
FIG. 1 is a schematic representation illustrating the preparation of a starch based hot melt formulation in an extruder.

It has been found that the selected intermediate or high DS starch esters in wetcake form, as described herein, can be formulated into a hot melt adhesive without heating or drying the starch prior to blending or combining it with the other components of the adhesive composition. Wetcake is defined as the resulting starch cake that remains after an aqueous slurry of the starch ester is filtered or centrifuged. Wetcake can also be the product obtained directly from the starch esterification without any drying. In any case, wetcake can be obtained by reslurrying dry starch esters or as the product of the esterification reaction that is not dried. The starch ester wetcake as used herein will contain at least 40% water by weight, more particularly from about 40 to 60% and preferably from about 45 to 55% by weight of water. Because the selected starch esters do not cook in water they can be mixed or combined directly with the diluent and other components and heated without pre-drying or otherwise pre-removing water that is present.

The starch ester that is used in this invention is an intermediate or high DS starch ester having a DS (degree of substitution) of from about 0.3 to 3.0, preferably from about 0.7 to 2.4 and more preferably from about 0.8 to 2.0. The term "degree of substitution" (DS) as used herein indicates the average number of sites per anhydroglucose unit of the starch molecule on which there are substituent groups. The starch ester will have the formula:

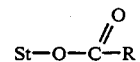

where St represents the starch base material and R is an alkyl, aryl, alkenyl, alkaryl or aralkyl of 1 to 17, preferably 1 to 6 carbon atoms. More preferably, the ester compound will contain an R group which is an alkyl of 1 to 2 carbon atoms. Starch esters of this type include starch acetate, starch propionate, starch butyrate, starch hexanoate, starch stearate, starch oleate, starch benzoate, blends of two more of these esters, for example starch acetate/starch propionate and mixed starch esters where the starch contains two or more different ester substituents, e.g., starch acetate/propionate, i.e., the ester having the formula such as:

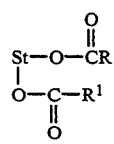

where R and $R^1$ represent different substituent groups as defined above.

The starch esters which are used in this invention are prepared from the respective carboxylic acid anhydride or acid chlorides. Typical methods include reactions in aqueous systems as disclosed in U.S. Pat. No. 2,461,139 issued Feb. 8, 1949 to C. Caldwell and in solvent systems such as pyridine. These and other methods are disclosed in "Modified Starches: Properties and Uses", edited by O. B. Wurzburg, Chapter 4, pp. 55–77, 1986 and "Starch: Chemistry and Technology", edited by R. L. Whistler, et al., Chapter X, pp. 332–343, 1984. While the different starch esters having varied DS levels can be prepared using one or more of the known methods, the preferred intermediate DS levels of about 0.3 to 2.0 have not heretofore been readily available. An improved method for preparing these intermediate DS starch esters using an aqueous system is disclosed in U.S. Pat. No. 5,321,132 issued Jun. 14, 1994 to R. Billmers, et al.

The base starch material used in the starch esters may be any of several starches, native, converted or derivatized. Such starches include those derived from any plant source including corn, potato, wheat, rice, sago, tapioca, waxy maize, sorghum and high amylose starch such as high amylose corn, i.e., starch having at least 45% and more particularly at least 65% amylose content by weight, etc. Starch flours may also be used. Also included are the conversion products derived from any of the former bases, such as, for example, dextrins prepared by hydrolytic action of acid and/or heat; fluidity or thin boiling starches prepared by enzyme conversions or mild acid hydrolysis; oxidized starches prepared by treatment with oxidants such as sodium hypochlorite; and derivatized starches, such as, cationic, anionic, amphoteric, non-ionic, and crosslinked. While any of these starches may be used, the high amylose starches and particularly those having amylose content of at least 65% by weight are preferred. Although the full molecular weight or unhydrolyzed starches can be used as the base material, particularly useful are those starches which have been hydrolyzed but not severely degraded. Such starches have a dextrose equivalent (DE) of less than about 10 and preferably less than about 5. Dextrose equivalent (DE) is defined as the reducing power of the hydrolyzate. Each starch molecule has one reducing end, therefore DE is inversely related to molecular weight. The DE of anhydrous D-glucose is defined as 100 and the DE of unhydrolyzed starch is virtually zero.

In addition to the starch ester component, it is necessary to include a diluent in the hot melt adhesive formulation. The diluent is a non-volatile organic material which is compatible with the modified starch ester and will be present in sufficient amount to allow the formulation to function as a hot melt by melting and forming a homogeneous melt at the application temperature and having a suitable viscosity at that temperature. This means the use of diluent will allow the formulation to melt at the application temperature, i.e., 400° F. (204° C.) or less, and also possess the desired viscosity of <50,000 cP at that temperature. A variety of materials can be used as a diluent in combination with the selected modified esters to satisfy the desired conditions. More particularly, the diluent will be an organic material which is non-volatile and compatible with the starch ester and is characterized in containing one or more polar groups, i.e., it is not an all hydrocarbon material. Typically it will have a molecular weight of 5,000 (number average) or less. Useful diluents containing polar groups include sulfonamides, carboxylic acids and esters, carboxylate salts, amides, phosphate esters, alcohols, i.e., hydroxy containing compounds, epoxides, sulfones, ethers, imides, amines, carbonates, ureas and urethanes. Preferred diluents are those containing sulfonamide, alcohol, amide and ester groups. The following compounds illustrate diluents which may be used: N-ethyl-o,(and/or p)-toluene sulfonamide, N-(2-hydroxypropyl) benzene sulfonamide, diethyl citrate, ricinoleic acid, triethylcitrate, diethyl phthalate, dibutoxy ethyl phthalate, butyl benzylphthalate, dimethyl adipate, diethylene glycol dibenzoate, sodium ricinoleate, sodium salts of rosins, N-(2-hydroxyethyl)-12-hydroxy stearamide, N-octyl pyrrolidone, 2-ethylhexyl diphenyl phosphate, tricresylphosphate, ethoxylates of phenol and bisphenol A, glycerin mono-ricinoleate, sorbitol mono-stearate, epoxidized oils such as soybean oil, tetramethylene sulfone, poly(ethylene glycol), N-butyl succinimide, poly(ethylene imine), ethylene carbonate and propylene carbonate.

The diluents as described above include a number of materials containing polar groups and may include plasticizers and waxes containing such polar functional groups. The preferred diluents include those containing sulfonamide, alcohol, amide and ester groups which absorb low levels of moisture at high humidity, i.e., have a moisture content of less than about 20%, preferably less than about 15% by weight, at 90% relative humidity (RH) and 23° C. Particularly preferred diluents are the alcohols or hydroxy containing compounds having this characteristic of low moisture absorption, i.e., hydrophobic alcohols and especially the ethoxylates of phenol and bisphenol A, and N-(2-hydroxyethyl)-12-hydroxy stearamide. The preferred diluents do not include the hydrophilic type alcohols such as glycerin or sorbitol and other compounds of this type which are hygroscopic and easily pick up and absorb moisture.

The major functional component of the adhesive, i.e., the modified starch ester, will be present in an amount of from about 10 to 80% by weight, preferably about 20 to 60% based on the total weight of the composition. The actual amount will vary depending on the type of ester modification, the amount or degree of substitution (DS) and the nature of the base starch. The end use application as well as the type and amount of other components will also be a factor in determining the amount of modified starch ester that is used.

The amount of diluent will vary from about 20 to 90% by weight of the adhesive composition and preferably from about 25 to 75%, based on the weight of the composition.

Optional components in the adhesive composition may include compatible polymers such as hydrophilic polymers or hydrophobic thermoplastic polymers, tackifiers and antioxidants.

The optional polymers may comprise up to about 35% by weight of the composition and include hydrophilic polymers such as water-soluble and/or water-swellable polymers and hydrophobic thermoplastic water-insoluble polymers. Such polymers include celluloses such as alkylcelluloses, hydroxyalkyl-celluloses, cellulose esters and cellulose salts, polyvinyl alcohols prepared by partial to essentially complete hydrolysis of polyvinyl acetate (preferably 45 to 80% hydrolyzed), synthetic polymers such as poly(acrylic acids) and their salts and esters, poly(acrylamides), poly(vinyl acetates), poly(vinyl acetate phthlates), poly(vinyl pyrrolidone), poly(crotonic acids), polyolefins such as polyethylene and polypropylene, vinylpolymers such as polyvinylacetates, polystyrene, polyacrylonitriles, polyvinylcarbazoles, polyacetals, polycondensates such as polyamides, thermoplastic polyesters such as polyhydroxybutyrate/hydroxy-valerate, polylactides (i.e., esters of lactic acid), polycarbonates, polyurethanes, poly(alkylene terephthalates), polyarylethers, poly(ethyl oxazoline), poly(ethylene imine), poly(ethylene glycol), thermoplastic polyimides, poly(alkylene oxides) such as polymers of ethylene oxide and propylene oxide, and gelatin.

Also included as optional polymers are thermoplastic copolymers such as ethylene/vinyl acetate, ethylene/vinyl alcohol, ethylene/acrylic acid, ethylene/ethylacrylate, and styrene/acrylonitrile.

Particularly useful are polymers containing polar groups such as those described earlier for the diluent with those containing hydroxyl groups being most preferred, especially polyvinyl alcohol, ethylene/vinyl alcohol and hydroxypropyl cellulose.

The adhesive compositions may also include tackifier resins in amounts of up to 70% by weight, based on the weight of the composition. The tackifying resins useful in the adhesive compositions are generally polar in nature and have a Ring and Ball softening point (as described by ASTM E-26) of greater than 60° C. and include rosin and rosin derivatives, terpene phenolics, pure phenolic resins, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) glycerol and pentaerythritol esters of natural and modified rosins, such, for example, as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) phenolic modified terpene resins and hydrogenated derivatives thereof such, for example, as the resin product resulting from the condensation, in an acidic medium, of a bicyclic terpene and a phenol; (4) thermoplastic alkyl phenolic resins such as those described in U.S. Pat. Nos. 4,073,776 and 4,023,826. Mixtures of two or more of the above described tackifying resins, as well as blends of the above resins with small amounts of (e.g., less than about 10% of the adhesive) less compatible resins may be utilized for some formulations.

An antioxidant or stabilizer may also be included in the adhesive compositions described herein in amounts of up to about 3% by weight. Among the applicable antioxidants or stabilizers are high molecular weight hindered phenols and multifunctional phenols such as sulfur and phosphorous-containing phenols. Representative hindered phenols include: 1,3,5-trimethyl 2,4,6-tris (3,5-di-tert-butyl-4-hydroxy-benzyl)benzene; pentaerythritol tetrakis-3(3,5-di-tert-butyl-4-hydroxyphenyl)-propionate; n-octadecyl-3,5-di-tert-butyl-4-hydroxyphenol)-propionate; 4,4'-methylenebis (2,6-tertbutylphenol); 4,4'-thiobis (6-tert-butyl-o-cresol); 2,6-di-tert-butylphenol; 6-(4-hydroxyphenoxy)-2,4-bis(n-octyl-thio)1,3,5-triazine; di-n-octadecyl3,5-di-tert-butyl-4-hydroxy-benzylphosphonate; 2-(n-octylthio)ethyl 3,5-di-tert-butyl-4-hydroxy-benzoate; and sorbitol hexa[3-(3,5-di-tert-butyl-4-hydroxyphenyl)propionate].

Other additives conventionally used in hot melt adhesives to satisfy different properties and meet specific application requirements also may be added to the adhesive composition of this invention. Such additives include waxes, plasticizers, extending oils, fillers, pigments, flow modifiers, dyestuffs, etc., which may be incorporated in minor or larger amounts into the adhesive formulation, depending on the purpose.

The starch esters and the preparation thereof, as well as the diluents and other components for use in the hot melt adhesive formulation are further described in application Ser. No. 08/106,023 filed Aug. 13, 1993 which is incorporated herein by reference.

The hot melt adhesive composition is prepared in accordance with this invention by combining or blending the selected starch ester wetcake and diluent and heating with mixing until the mixture reaches a light boil (temperature about 100° C.). Light boiling is maintained until the majority of the water is driven off as shown by a rise in temperature of the mixture above 100° C. Heating is continued to a temperature of about 100° to 150° C., preferably 110° to 135° C., for a short period to drive off essentially all of the remaining water followed by addition of components such as wax with continued heating and mixing until a consistent homogeneous composition is formed and the moisture content is <2% by weight of the composition. Other materials such as fillers, dyes, pigments, etc., can be added at any time during the above process. Water sensitive materials such as N-(2-hydroxyethyl)-12 hydroxy stearamide, should be added after the majority of water has been removed from the system. It is preferred that additional additives be introduced after the formulation has reached a temperature of about 135° C. When a wax like diluent is used, it is most preferable to be the last material added after all water has been removed and mixing of starch and melt is complete.

The resulting hot melt adhesive composition is characterized in that it has a viscosity of 50,000 cP or less at the application temperature of 400° F. (204° C.) or less. Viscosity as used herein is a Brookfield viscosity measured using a Brookfield viscometer model no. DV−II+ with spindle no. 27 at 20 rpm. The adhesive composition preferably contains less than about 2% and more preferably less than about 1% moisture by weight in the final composition, i.e., directly after blending or formulating.

In another embodiment of this invention a starch based hot melt adhesive is prepared by combining the starch ester, either wet cake (i.e., >40% by weight moisture) or in dry form, in an extruder, along with the diluent. Dry starch for the process may contain up to anywhere from about 1 to 40% by weight of water, more particularly from about 1 to 35%, and preferably from about 5 to 15%. The components are conveyed and mixed in the presence of heat and mechanical shear. The temperature is adjusted to allow for moisture to be driven from the extruder using a vent or vacuum port. After the removal of moisture in the vent section, other ingredients such as wax are dry fed into the extruder and the final heated mixture exits the die and is recovered.

The process of this invention as illustrated in FIG. 1 allows for the continuous production of a hot melt formulation in an extruder process unit. As shown in FIG. 1, the process unit comprises a series of individual barrels which are adjacent to one another and longitudinally connected. In the first barrel (No. 1), called the feed barrel, the starch feed is introduced through an inlet opening. A screw shaft runs through the entire length of the series of barrels. By the action of the screw elements on the screw shaft of the drive motor, the material is mixed and conveyed through the sequentially arranged barrels along the length of the extruder process unit. The screw shaft configuration may be a twin screw co- or counter-rotating configuration with the twin screw co-rotating configuration being preferred. In the barrel (No. 2) adjacent the feed barrel, diluent is added and mixed with the feed starch. The barrels subsequent to the starch and diluent feeds are heated to the desired temperatures. This is accomplished by individual heat exchange means (not illustrated) located in or adjacent each barrel. The heat exchange means generally can comprise a passage such as a channel, chamber or bore in the barrel for carrying selected heat transfer media or can be an electrical heater such as calrod or coil type. Heat exchange means could also be placed in or along the shaft of the screw device. The preferred type of heat exchange means is a passage carrying heat transfer media such as petroleum oil or other fluid.

As further illustrated in FIG. 1, a vent or vacuum port is provided at barrels No. 6 and 7 to remove residual water in the starch. After the vent section, the mixture continues to be heated and conveyed until a wax material is added through an open port (illustrated as barrel No. 9) along with optional other additives.

The starch ester as well as the diluent and other additives which may be used in the extrusion process for preparing the hot melt formulation are the same as described previously. The starch ester may be in wetcake form but also may be in dry form or contain varying amounts of moisture. While it is unusual to process hot melt formulations with an aqueous or wet feed material, the selected starch esters permit it since they are not soluble in water and will not melt or cook in water as other starches do.

By using the extrusion process and the selected starch esters, either in wetcake or dry form, hot melt formulations can be prepared in a rapid and continuous manner. In fact, the residence time in the extruder is a matter of about 1 to 2 minutes compared to a batch process which can run in the order of 0.75 to 1 hour or more.

The following examples will further illustrate the embodiments of this invention. In these examples all parts are given by weight and all temperatures in degrees Celsius unless otherwise noted.

EXAMPLE I

A starch hot melt formulation was prepared as follows. A one liter, four neck round bottom flask was equipped with a nitrogen inlet, thermometer and a mechanical stirrer. The flask was immersed in an oil bath so that the oil level covered ⅔ of the flask.

A fluidity, high amylose starch acetate wetcake containing 50% H₂O (170 g anhydrous, DS of 1.5) and Macol 206 EM, an ethoxylated bisphenol A obtained from PPG/Mazer (243 g) were added to the flask with moderate stirring. The contents of the flask was heated to 70° C. and held for 30 minutes. A nitrogen flow of 5 liters/minute was used to aid in the removal of water vapor. The oil bath temperature was increased to produce light boiling of the flask contents.

Light boiling of the flask contents was maintained until the majority of the water was driven off which was recognized by the rise in temperature of the flask contents above 100° C. The oil bath was heated to 150° to 160° C. as needed to raise the contents temperature of the flask to 125° C. and held there for 10 minutes. At this point Paracin 220 (46 g), N-(2-hydroxyethyl)-12-hydroxystearamide, a wax obtained from Cas Chem, was added with stirring and heating continued for 10 minutes. At no point was the flask contents allowed to rise above 135° C.

The following properties were measured. Viscosity was determined on a Brookfield viscometer model No. DV−II+, at 20 rpm using Spindle 27 and a temperature of 275° F.

Adhesion to kraft paper was tested in the following manner. A molten bead of hot melt at 250° to 275° F. was drawn across the middle (widthwise) of a 1"×3" strip of kraft paper. A second strip of kraft paper was then immediately superimposed upon the first and a 200 gram weight placed on top of the construction. The kraft to kraft bonds were tested at 0° F. and 40° F. after aging or conditioning overnight and at 70° F./50% relative humidity after conditioning for one week. The samples were pulled apart by hand at the temperature of storage in a 90° peel mode and a determination made as to the type of failure, fiber tearing (FT) or non-fiber tearing (NFT).

The adhesive was also subjected to peel/shear testing such as conventionally required in the packaging industry. In the peel temperature test a bead of test adhesive approximately ⅛ inch in diameter was applied at 250° to 275° F. with a glass rod onto 60 pounds/ream kraft paper. A second sheet of the same paper was superimposed on the first sheet within two seconds and pressed thereto to form a kraft to kraft bond. The bonded sheets were then cut perpendicular to the adhesive line into one inch wide strips. Duplicate bonded specimens were placed in an oven with one free end of the specimen attached to a fixed support and a 100 gram load suspended from the other sheet at the same end of the bond. The oven temperature was then increased from room temperature in 10° F. increments at 20 minute intervals. The temperature at which bond delamination occurred was specified as the peel temperature.

In the shear temperature test, samples were prepared as in the peel temperature test, but separate sheets of kraft paper, at opposite ends of the bonded specimen were suspended and weighted to stress the bond in a shear mode. The temperature of the oven was increased as in the peel test until failure occurred.

The hot melt adhesive prepared with the starch ester wetcake had good adhesion properties and compared favorably with the hot melt prepared with dry starch ester as shown in the following table.

| PHYSICAL PROPERTY | WETCAKE PROCESS | DRY PROCESS |
| --- | --- | --- |
| Viscosity @ 275° F. | 2100 cP | 2000 cP |
| Adhesion (kraft/kraft) | | |
| 0° F. | Fiber tear | Fiber tear |
| 20° F. | Fiber tear | Fiber tear |
| 40° F. | Fiber tear | Fiber tear |
| 70° F., 50% RH | Fiber tear | Fiber tear |
| Peel Failure T (°F.) | 130 | 130 |
| Shear Failure T (°F.) | 160 | 160 |

EXAMPLE II

A starch hot melt adhesive formulation was prepared using a Werner and Pfieiderer twin screw co-rotating extruder, model ZSK 30 (LD=36).

As shown in the figure, a fluidity high amylose starch acetate (DS=1.5) wetcake (45 to 55% moisture) was fed to the feed barrel after crumbling and a hydrophobic diluent, Macol 206 EM, an ethoxylated bisphenol A (moisture content <2%) was pumped in immediately after the starch feed. Mixing of the components was carried out by the screw elements (kneading blocks). The extruder barrels subsequent to the diluent input were heated to 180° C. and 200° C. respectively, as shown in the figure with a vent/mechanical vacuum used to remove residual water associated with the starch. After the vent section, the mixture continued to be heated and conveyed until a wax material, Paracin 220, N-(2-hydroxyethyl)-12-hydroxystearamide (10 parts) was introduced into the extruder through an open port. The wax was dry fed and melted when blended into the mixture. The mixture exited the extruder through an open die plate as a clear light yellow liquid which quickly cooled to form a solid hot melt (moisture <2.0%).

EXAMPLE III

A starch hot melt formulation using a dry starch ester (~5.0% moisture) was prepared using an extruder in the same manner as Example II. The starch ester was a fluidity high amylose starch acetate (DS=1.5) and was feed to the extruder as a flowable powder. The prepared hot melt had a moisture content of <1.0% and a formulation of:

| | |
|---|---|
| starch ester | 41% |
| Macol 206 EM | 49% |
| Paracin 220 | 10% |

The properties of the hot melt adhesive were determined and shown in the table below:

| Physical Property | Extrusion Processed Hot Melt |
|---|---|
| Viscosity @ 275° F. | 2400 cP |
| Adhesion (kraft/kraft) | |
| 20° F. | Fiber tear |
| 40° F. | Fiber tear |
| 70° F., 50% RH | Fiber tear |
| Peel Failure T (°F.) | 130° F. |
| Shear Failure T (°F.) | 167° F. |

What is claimed is:

1. A method of preparing a hot melt adhesive composition comprising
   a) combining a starch ester having a degree of substitution (DS) of from about 0.3 to 3.0 and a diluent which is a non-volatile polar organic material which is compatible with the starch ester, the starch ester being in wetcake form and having a moisture content of 40% or more by weight, and
   b) heating for a sufficient time period to boil off essentially all of the moisture leaving a composition having less than 2% by weight of moisture based on the weight of the composition.

2. The method of claim 1 wherein the starch ester has a DS of from about 0.7 to 2.4.

3. The method of claim 2 wherein the mixture is heated to a temperature of about 100° to 150° C.

4. The method of claim 2 wherein the starch ester has from about 2 to 18 carbon atoms in the ester component and the diluent is present in sufficient amount to allow the composition to melt at an application temperature of 400° F. or less and have a viscosity of 50,000 cP or less at that temperature.

5. The method of claim 3 wherein from about 10 to 80% by weight of the starch ester and about 20 to 90% by weight of the diluent are used based on the weight of the composition.

6. The method of claim 4 wherein the starch ester wetcake contains from about 40 to 60% by weight of moisture.

7. The method of claim 6 wherein the starch ester contains 2 to 7 carbon atoms in the ester component.

8. The method of claim 6 wherein from about 0 to 35% by weight of a compatible hydrophilic or hydrophobic thermoplastic polymer, from about 0 to 70% by weight of a tackifier and from about 0 to 3% by weight of an antioxidant are additionally added to the adhesive composition.

9. The method of claim 8 wherein the diluent contains a sulfonamide, alcohol, amide or ester group.

10. The method of claim 8 wherein the starch material is high amylose starch having at least 65% by weight amylose content.

11. The method of claim 8 wherein the starch ester has a DS of from about 0.8 to 2.0.

12. The method of preparing a starch based hot melt adhesive composition comprising:
    a) extruding a starch ester having a degree of substitution (DS) of from about 0.3 to 3.0, the starch ester being either in wetcake form or dry form and having a moisture content of 1% by weight or more, in combination with a diluent which is a non-volatile polar organic material which is compatible with the starch ester, and
    b) heating and conveying the combined starch ester and diluent mixture to a sufficient temperature to boil off essentially all of the water and recover the final product exiting the extruder and having a moisture content of less than 2% by weight.

13. The method of claim 12 wherein the starch ester is in wetcake form and has a moisture content of 40% or more by weight.

14. The method of claim 13 wherein the starch ester has a DS of from about 0.7 to 2.4.

15. The method of claim 14 wherein the starch ester has from about 2 to 18 carbon atoms in the ester component and the diluent is present in sufficient amount to allow the composition to melt at an application temperature of 400° F. or less and have a viscosity of 50,000 cP or less at that temperature.

16. The method of claim 15 wherein from about 10 to 80% by weight of the starch ester and about 20 to 90% by weight of the diluent are used based on the weigh of the composition.

17. The method of claim 16 wherein the starch ester contains 2 to 7 carbon atoms in the ester component.

18. The method of claim 17 wherein from about 0 to 35% by weight of a compatible hydrophilic or hydrophobic thermoplastic polymer, from about 0 to 70% by weight of a tackifier and from about 0 to 3% by weight of an antioxidant are added to the adhesive composition in the extruder after the water is vented off.

19. The method of claim 18 wherein the diluent contains a sulfonamide, alcohol, amide or ester group and the starch material is high amylose starch having at least 65% by weight amylose content.

* * * * *